United States Patent [19]

Laude

[11] 4,298,845
[45] Nov. 3, 1981

[54] DYE LASERS

[75] Inventor: Jean-Pierre Laude, St. Cyr la Riviere, France

[73] Assignee: Instruments S.A., Paris, France

[21] Appl. No.: 83,533

[22] Filed: Oct. 10, 1979

[30] Foreign Application Priority Data

Oct. 18, 1978 [FR] France .................. 78 29690

[51] Int. Cl.³ .............................. H01S 3/05
[52] U.S. Cl. .............................. 331/94.5 C
[58] Field of Search ............ 331/94.5 C, 94.5 D, 331/94.5 L

[56] References Cited

U.S. PATENT DOCUMENTS 3,739,295  6/1973  Shah .................. 331/94.5 C
3,938,058  2/1976  Yamamoto ............. 331/94.5 C

OTHER PUBLICATIONS

"Repetitively Pulsed Tunable Dye Laser for High Resolution Spectroscopy"; by Hänsch; App. Optics, No. 4, vol. 11, Apr. 72.

Primary Examiner—William L. Sikes
Assistant Examiner—Leon Scott, Jr.
Attorney, Agent, or Firm—Haseltine & Lake

[57] ABSTRACT

In a dye laser comprising a cavity, one end of which is closed by an angular dispersion system, and which is provided with a separator for extracting the laser beam from the cavity, the separator is arranged so that the dispersive system and the system for application of the laser beam are on the same side relative to the separating face of the separator. An aperture isolates the reference wavelength from the extracted beam.

Such a laser can have very good monochromaticity and is useful wherever there is a need for high spectral purity, in particular in Raman spectrometry.

3 Claims, 4 Drawing Figures

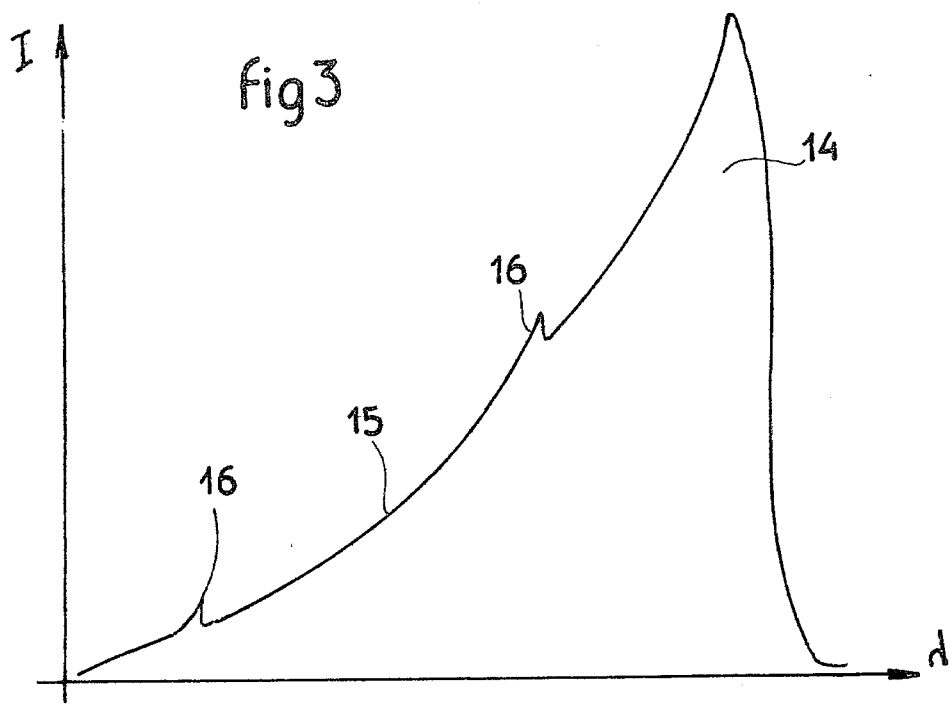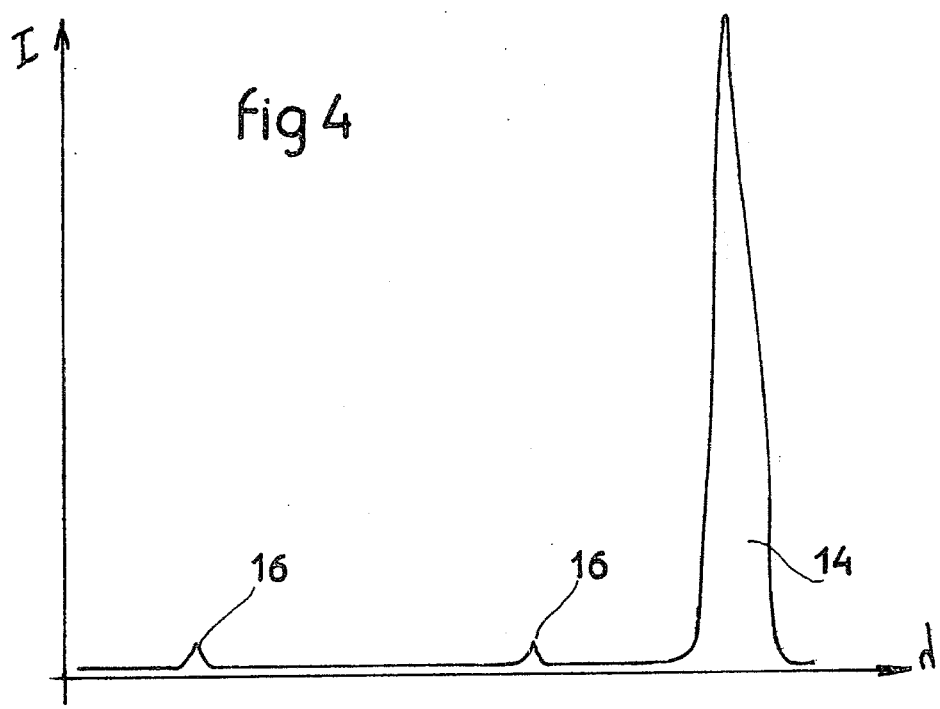

DYE LASERS

The present invention relates to an improvement to a dye laser.

A dye laser is a laser in which the amplifying medium consists of a solution of specific dyes, for example from the class of the scintillators, namely coumarins, xanthenes, oxazine or cyanins.

This medium is generally optically pumped by a flash lamp (or even, as shown more recently, by a continuous arc) or by another continuous laser, such as an ionised argon or ionised krypton laser, or finally by a pulsed laser, such as a YAG or nitrogen laser, or an eximeric laser.

The principal value of these lasers lies in the fact that they provide sources of monochromatic light of adjustable wavelength. In fact, gas lasers are also known to provide sources of monochromatic light but they do not have an adjustable wavelength.

The monochromaticity is achieved by placing the laser medium in a cavity with a selective system which is selective in terms of wavelength. The selective system consists, for example, of a prism, a grating, a Fabry-Perot interferometer, a birefringent plate or a combination of these various elements.

The adjustment and the scanning of the wavelengths are carried out by altering the selective system. For example, the grating or the prism is rotated about an axis, the plate separation in the Fabry-Perot interferometer is varied or the birefringent plate is rotated about itself.

When several of these dispersive systems are used in combination, the synchronisation of the scanning operations is a recognised problem.

A dye laser is known to have the following disadvantage: the light emitted by a dye laser consists of an intense line, called the laser line, surrounded by a background fluorescence. Energy apart from the laser line is therefore present.

To illustrate the disadvantage which poor monochromaticity represents, reference will be made to FIG. 3 of the accompanying drawings. This figure shows the Raman spectrum of a substance on a molecular microprobe. The wavelength λ has been plotted on the abscissa and the light intensity I has been plotted on the ordinate. It is seen that the exciting line 14 is accompanied by a fluorescence background 15 which completely masks the secondary lines 16, rendering this Raman spectrum totally unusable.

Attempts have been made to overcome this disadvantage by eliminating, using various artificial means, part of the stray energy forming the fluorescence background. For example, spatial filtering, or passage through a dispersive device placed at the outlet of the laser, are known. In this latter case, the filtering can be excellent, but the synchronization of the filtering device with the wavelength scanning of the laser remains a problem to be solved.

According to the invention there is provided a dye laser comprising a cavity, one end of which is closed by an angular dispersive system, and which is provided with a separator for extracting the laser beam from the cavity, wherein said separator is arranged so that in use with a system for application of the laser beam, said dispersive system and said system for application of said extracted laser beam are on the same side relative to the separating face of said separator and aperture means for isolating the reference wavelength from said extracted beam.

If the dispersive system and the system for the application of the laser beam are on the same side relative to the separating face, the light of the beam sent to the application system by the separating face is exclusively dispersed light. Consequently, at the outlet of the aperture means, not all the wavelengths emitted by the dye itself, in particular the fluorescence background, are seen.

In a preferred embodiment according to the invention, the aperture is arranged on the dispersed beam between the separator and the application system.

In another embodiment according to the invention, the size and the position of the separator are determined so that the separator itself acts as an aperture by only separating out the reference wavelength from the beam.

Preferably, the laser is further improved by placing, on the other side of the separator, relative to the dispersive system, a mirror for recycling the beam lost by stray reflection of the beam falling on the separator. This mirror is arranged so as to return the lost beam towards the dispersive system, parallel to the main beam.

Embodiments of lasers according to the invention will now be described, by way of example only with reference to the accompanying drawings.

FIG. 3 which has been referred to above, shows a Raman spectrum run using a known laser; and FIG. 4 shows a Raman spectrum run using a laser according to the invention.

Figure 2:
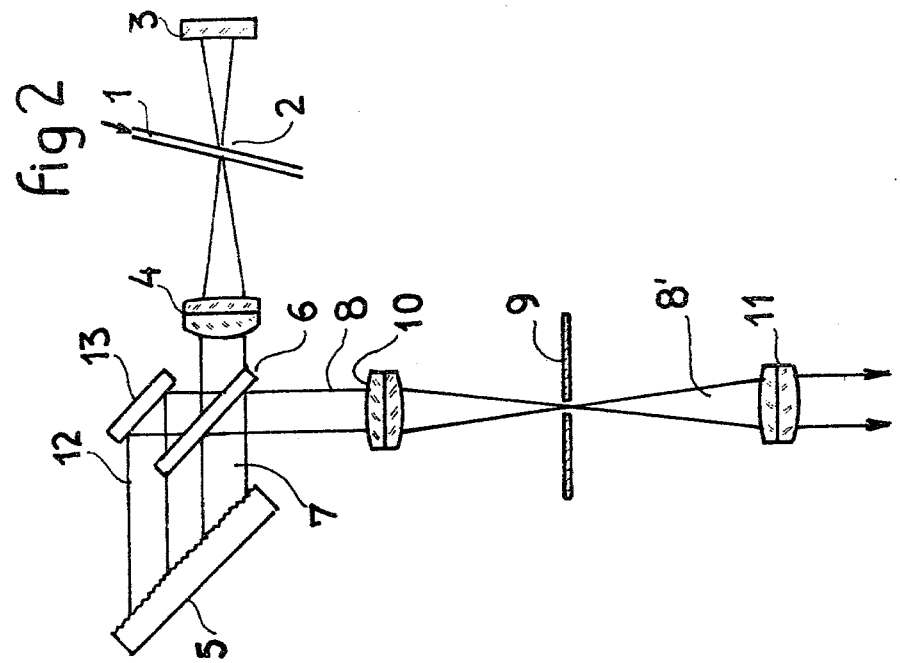
FIG. 2 is a diagrammatic view of a second embodiment of a dye laser according to the invention.
Figure 1:
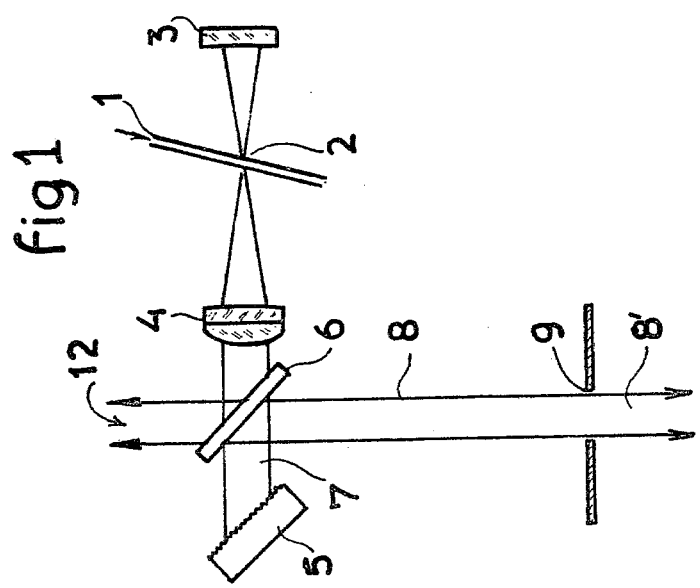
FIG. 1 is a diagrammatic view of a first embodiment of a dye laser according to the invention.

The dye lasers shown in FIGS. 1 and 2 each comprise a stream 1 of dye, excited at point 2 by an ionised argon laser which is not shown in the drawing, a totally reflecting mirror 3, placed at one end of the cavity, and an objective 4.

The other end of the cavity is closed by an angular dispersive system 5. This system may be, for example, a prism or, preferably, a high-efficiency grating giving a low level of ghost lines and stray light. This is, for example, a conventional grating ruled on a machine with interferometric control or a holographic grating.

The laser of FIG. 1 also comprises a beam-separating system 6. This system may consist of a plate which reflects a portion of the energy by means of one of its faces, the other face being treated so as to be anti-reflecting. Thus, in the case of the rays travelling from right to left, the laser beam is divided by this plate into a beam 7, which is the conventional intracavity beam of the laser, and a beam 12, which constitutes a loss of light. In the case of the rays travelling from left to right, the beam is divided into a beam 8 and a beam travelling towards mirror 3.

The separating system 6 therefore causes half the dispersed laser beam 7 to pass outside the cavity.

An aperture 9 receives the beam 8.

It is observed that the dye laser can only be seen from the aperture 9 when it has passed via the dispersive system, since any ray forming the beam 8 necessarily passes via the dispersive system 5 by virtue of the presence of the separating system 6.

The beam 8' emerging from the aperture 9 is therefore a beam of very good monochromaticity since the entire beam has passed via a dispersive system.

It will be noted that, even if the dispersive system rotates about its axis, the aperture can remain in the same position, the extracted laser beam 8 remaining in the same direction and in the same position.

The aperture 9 could be dispensed with by choosing a separator 6 of small surface area and by placing this separator at a fairly large distance from the dispersive system 5. Thus, the separator could itself act as the aperture by only separating the reference wavelength from the dispersed beam.

Reference will now be made to FIG. 2, which shows an improved laser compared with that of FIG. 1.

Firstly, an objective or a lens 10 is introduced into the path of the beam 8. This objective is necessary in the case where the laser beam is used at a fairly short distance from the laser cavity, the angular separation between the fluorescence background and the laser beam being insufficient for filtering to be possible with a simple aperture 9 and no intermediate focusing. It is also necessary to introduce an objective or a lens 11 in order to make the laser beam emerging from the aperture 9 parallel again.

It has already been noted above that, with the laser of FIG. 1, part of the energy extracted from the cavity is lost. In fact, the separating system 6 sends a beam 12 upwards by partial stray reflection, which beam cannot be utilised in this form because it has not passed via the angular dispersion system 5.

It is for this reason that a mirror 13 of good reflecting power has been added, which sends the beam 12 back to the angular dispersion system 5, parallel to the beam 7. After having been dispersed, the beam 12 is again reflected onto the mirror 13 and passes through the separating system 6 to rejoin the beam 8.

A kind of recycling of the beam is thus effected and this prevents a loss of efficiency in the extraction of the useful energy.

Thus, with the lasers described above, all the energy extracted from the cavity is extracted with angular separation of the fluorescence background from the laser line.

FIG. 4 shows a Raman spectrum obtained using a laser according to the invention. This spectrum is usable because the secondary lines 16 are not masked by the fluorescence background of the exciting line 14.

Such a laser beam is consequently a beam of very good monochromaticity, which is furthermore of adjustable wavelength, whereas, with gas lasers, it was possible to obtain good monochromaticity but the beam was not of adjustable wavelength.

Of course, the invention is not intended to be strictly limited to the embodiments which have been described, but also includes embodiments which differ therefrom in details, in the methods of carrying out the process or in the use of equivalant means.

Thus, it is applicable in the same way to a laser having a prism, rather than a grating, as the dispersive system.

Also, it is not essential for the laser beams and the extracted beams to be perpendicular to one another as shown in FIGS. 1 and 2. It is only necessary for the beams which are incident on the dispersive system 5 to be parallel to one another.

Furthermore, it will be noted that, after having been diffracted by the dispersive system 5, the beam 12 continues in the direction of beam 8, but a small part is also re-injected into the laser cavity. If desired, this part can be used for spectral purification of the laser line.

To further improve the results obtained using the laser according to the invention, the beam 8 can be redispersed one or more times by the dispersive system 5. For example, it is possible to use a mirror for sending the beam 8 back to the dispersive system 5, the returned beam being located slightly out of the plane of the figure. It is also possible to place the reflecting mirror behind the aperture 9 and to return the beam 8'.

There are thus provided lasers in which stray energy in the dispersed beam has been eliminated without at the same time introducing the disadvantage mentioned above of known lasers.

The laser energy is dispersed and extracted in such a way that the laser line is automatically filtered. Such a laser can be used in Raman spectrometry and, more generally, wherever there is a need for high spectral purity.

What is claimed is:

1. In a dye laser, a combination comprising
   means defining a resonant cavity having two ends;
   a reflecting mirror closing one of said ends, and an angular dispersive system in form of a grating closing the other of said ends;
   means for passing a stream of dye as the active medium through said cavity;
   a beam separating system intermediate said two ends for extracting the main laser beam from the cavity in two opposite directions, the part of the beam which is extracted in one of the directions being a useful beam part and being directed from said angular dispersive system towards a system for application, and the part of the beam which is extracted in the other direction being a stray useless beam part;
   aperture means in the path of said useful beam part within or without said cavity for isolating one wavelength from said useful beam part; and
   a mirror for recycling said stray useless beam part and returning the same towards said angular dispersive system in parallelism with said main laser beam.

2. A dye laser according to claim 1, in which said beam-separating system comprises a semi-reflecting mirror of small surface area and is placed at a fairly large distance from the said angular dispersive system so that said beam-separating system itself acts as said aperture means by only separating one wavelength from said extracted beam.

3. A dye laser according to claim 1 or claim 2, in which, between the said beam-separating system and the said system for application, at least one semi-reflecting mirror is arranged so as to return said useful beam part towards said dispersive system, parallel to the main laser beam, before use.

* * * * *